(12) United States Patent
Zhang et al.

(10) Patent No.: US 10,200,915 B2
(45) Date of Patent: *Feb. 5, 2019

(54) SYSTEM AND METHOD FOR USER EQUIPMENT CENTRIC UNIFIED SYSTEM ACCESS IN VIRTUAL RADIO ACCESS NETWORK

(71) Applicant: Huawei Technologies Co., Ltd., Shenzhen (CN)

(72) Inventors: Liqing Zhang, Ottawa (CA); Jianglei Ma, Ottawa (CA); Kelvin Kar Kin Au, Kanata (CA); Zhihang Yi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/480,819

(22) Filed: Apr. 6, 2017

(65) Prior Publication Data

US 2017/0215110 A1 Jul. 27, 2017

Related U.S. Application Data

(63) Continuation of application No. 13/608,653, filed on Sep. 10, 2012, now Pat. No. 9,648,558.

(51) Int. Cl.
| | |
|---|---|
| *H04W 36/00* | (2009.01) |
| *H04W 48/20* | (2009.01) |
| *H04W 74/00* | (2009.01) |
| *H04W 76/11* | (2018.01) |
| *H04W 72/04* | (2009.01) |

(Continued)

(52) U.S. Cl.
CPC ....... *H04W 36/0027* (2013.01); *H04W 48/20* (2013.01); *H04W 72/048* (2013.01);
(Continued)

(58) Field of Classification Search
CPC ... G06Q 20/3829; H04W 52/12; H04W 4/008
(Continued)

(56) References Cited

U.S. PATENT DOCUMENTS

| 6,526,037 B1 | 2/2003 | Song et al. | |
|---|---|---|---|
| 2006/0274776 A1* | 12/2006 | Malik | H04B 7/00 370/445 |

(Continued)

FOREIGN PATENT DOCUMENTS

| CN | 101938775 A | 1/2011 |
|---|---|---|
| CN | 101938810 A | 1/2011 |

(Continued)

*Primary Examiner* — Kiet M Doan
(74) *Attorney, Agent, or Firm* — Slater Matsil, LLP

(57) ABSTRACT

A network for facilitating wireless radio communication. The network includes a first access area, wherein the access area includes one or more transmission/receive points. At least one transmission/receive point includes a base station that supports wireless communication between a network and user equipment (UE), such as, a mobile device. The network includes a dedicated connection signature (DCS) that is assigned to a UE. The DCS provides for and is used by the UE to maintain active, unified access to the wireless network. More particularly, the DCS provides for active, contention free, and fast access for the UE to the network through transmission/receive points within the first access area, which is of significance to present and future UE centric virtual radio access networks having high densities of mobile and non-mobile users and with high populations of different types of traffic patterns and applications.

20 Claims, 14 Drawing Sheets

(51) Int. Cl.
*H04L 5/00* (2006.01)
*H04W 12/06* (2009.01)

(52) U.S. Cl.
CPC ............ *H04W 74/00* (2013.01); *H04W 76/11* (2018.02); *H04L 5/0016* (2013.01); *H04W 12/06* (2013.01)

(58) Field of Classification Search
USPC ... 455/456.3, 550.1, 436, 414.2, 422.1, 450, 455/458, 434, 452.1, 411, 410, 432.1; 370/328, 342, 350, 449, 445, 252; 713/168; 375/219
See application file for complete search history.

(56) References Cited

U.S. PATENT DOCUMENTS

| | | | |
|---|---|---|---|
| 2009/0016353 A1* | 1/2009 | Li | H04W 8/005 370/395.3 |
| 2009/0103558 A1* | 4/2009 | Zangi | H04W 74/0841 370/447 |
| 2009/0252125 A1 | 10/2009 | Vujcic | |
| 2010/0056155 A1* | 3/2010 | Tajima | H04W 36/0072 455/436 |
| 2010/0105405 A1* | 4/2010 | Vujcic | H04J 13/22 455/452.1 |
| 2010/0329193 A1 | 12/2010 | Bienas et al. | |
| 2010/0329216 A1 | 12/2010 | Jen | |
| 2012/0250659 A1 | 10/2012 | Sambhwani | |

FOREIGN PATENT DOCUMENTS

| | | |
|---|---|---|
| CN | 102281542 A | 12/2011 |
| EP | 1662677 A1 | 5/2006 |
| EP | 2053757 A1 | 4/2009 |
| WO | 2008096959 A1 | 8/2008 |
| WO | 2008114983 A2 | 9/2008 |
| WO | 2012021784 A1 | 2/2012 |

* cited by examiner

300C

| $N_{zc}$ | $N_{cs}$ | # of available sequences | (Auto-)correlation between two sequences with same root | (Cross-)correlation of any two sequences with different roots |
|---|---|---|---|---|
| 839 | 13* | 53632 | 0 | 0.0345 |
| 839 | 5^ | 139,946 | 0 | 0.0345 |
| 839 | 13* | 13,440 | 0 | 0.0487 |
| 839 | 5^ | 35,280 | 0 | 0.0487 |
| 839 | 13* | 42 | 0 | 0.0688 |
| 839 | 5^ | 8820 | 0 | 0.0688 |

\* Supports up to approximately 15 km between UE and reception points.

^ Supports up to approximately 5 km between UE and reception points

810
VALIDATING A USER EQUIPMENT (UE) UPON INITIAL ENTRY TO A COMMUNICATION NETWORK THROUGH A CORRESPONDING TRANSMISSION/RECEIVE POINT, WHEREIN THE COMMUNICATIONS NETWORK COMPRISES A PLURALITY OF TRANSMISSION/RECEIVE POINTS, ONE OF WHICH INCLUDES A BASE STATION SUPPORTING WIRELESS RADIO ACCESS TO THE COMMUNICATIONS NETWORK FOR ONE OR MORE UEs

820
ASSIGNING A DEDICATED CONNECTION SIGNATURE (DCS) TO THE UE, WHEREIN THE DCS PROVIDES ACTIVE ACCESS FOR THE UE TO TRANSMISSION/RECEIVE POINTS WITHIN AN ACCESS AREA PROVIDING WIRELESS RADIO ACCESS TO THE COMMUNICATIONS NETWORK

FIG. 8

SYSTEM AND METHOD FOR USER EQUIPMENT CENTRIC UNIFIED SYSTEM ACCESS IN VIRTUAL RADIO ACCESS NETWORK

CROSS-REFERENCE TO RELATED APPLICATIONS

The present application is a continuation application of U.S. patent application Ser. No. 13/608,653 filed Sep. 10, 2012 and titled "System and Method for User Equipment Centric Unified System Access in Virtual Radio Access Network," which is incorporated herein by reference.

BACKGROUND

A cellular network provides wireless access for user equipment (UE) (e.g., mobile phones, computers, transceivers, etc.) for purposes of communication. The network includes multiple cells, each supported by a base station that is used for transmitting and receiving communication signals. Collectively, the cells provide wireless, radio coverage over a large geographic area. In this manner, UEs are able to communicate with each other throughout the cellular network. Additionally, the cellular network is able to connect with other networks (public switched telephone network, other cellular networks, internet based networks, etc.) to facilitate communication between devices connecting to any of the available networks.

In order to transmit information (e.g., voice, data, etc.) over the cellular network, a UE must first perform a network connection or initial entry setup with a serving cell in order to identify and validate itself to the network. This occurs under various scenarios while the UE is within the geographic boundaries supported by the cellular network. To name a few instances, the UE performs an initial entry setup with a supporting cell of the cellular network when the UE powers on, transitions from an idle to active state, makes a bandwidth request for uplink data transmission, transmits location information, or performs UE re-synchronization when the uplink is out of synchronization or when a failure occurs on the uplink.

Current UE network access schemes are associated with a cell and its cell identifier. This cell-based scheme allows for a UE to communicate through the cellular network by obtaining an access signature sequence for use with the serving cell. That is, once the UE has been identified and validated during the initial entry setup, the UE will be assigned a signature sequence by the serving cell for UE cell-based access activities with the cellular network.

However, there are a limited number of access sequences per cell. For instance, there may be only 64 access sequences that can be used throughout a single cell, as in a fourth generation long term evolution (4G LTE) cellular network. Because of this limited number, UEs release their access sequences when not in use to make them available to other UEs actively requiring service from the cell. For instance, after a period of communication inactivity (e.g., as established through expiration of a timer) a UE releases its access sequence and goes into an idle mode in terms of communication with the cellular network. Transitioning back to an active mode from the idle mode may require performing an additional initial entry setup process. Reperforming the initial entry setup makes the connection setup very long and inefficient.

Also, because the network access scheme is based on a servicing cell, when a UE moves from one cell to another, the UE has to get a new access signature that is assigned by the new cell through the current serving cell. This handover process should be completed when the UE can switch to the new cell. When successful, the handover process avoids performing an initial entry setup process. Unfortunately, because the handover process occurs on one or more cell boundaries, the signal strength of the airlink is limited which possibly results in a poor link between the UE and the serving cell. As such, whenever the link is lost, the UE must again perform the costly initial entry process with the new cell in order to connect back to the network. The inefficiency is further exposed when the UE ping-pongs or moves back and forth between the two cells, requiring increased signaling overhead for the same UE accessing the cellular network.

Moreover, future networks may exhibit increased transmit node densification in order to increase radio access capacity. For instance, transmit point virtualization is a way to handle inter-transmit point interference. With transmit point virtualization, the traditional fixed one-to-one mapping between a UE and a cell no longer exists. Instead, a network can dynamically select the best transmit/receive points to serve a particular UE, wherein the transmit point selection is transparent to the UE. As a result, the current UE/cell based network access scheme may not be compatible with transmit point virtualization.

The current UE/cell association access scheme is inefficient as it a UE may have to perform multiple, costly initial entry setup processes within a cell boundary or when performing a handover process. In addition, the current access scheme may be unsuitable for high density UE terminals and devices (e.g., smart meters, etc.). Furthermore, the current access scheme may not be applicable to future wireless networks, in which two or more transmit/receive points may serve one UE to enhance communication link quality, or where the number of transmit/receive points serving one (e.g., mobile) UE can vary with these network configurations being transparent to the UE.

SUMMARY

A network for providing a UE centric unified system access. The network includes a first access area comprising one or more transmission/receive points. At least one transmission/receive point supports wireless radio access to one or more UEs. A first dedicated connection signature (DCS) is assignable to a first UE. The DCS provides for active access for the first UE to the first access area, wherein at least one transmission/receive point in the first access area provides wireless radio access to a wireless, radio communications network.

In another embodiment, a method for accessing a network is described. The method includes configuring a plurality of transmission/receive points providing wireless radio access into at least one access area. At least one transmission/receive point of the plurality of transmission/receive points supports wireless radio access to a communications network. A plurality of dedicated connection signatures (DCSs) is provided. The DCSs provide active access to the communications network for a plurality of UEs. The method also includes configuring a first group of DCSs to provide active access to the communications network, wherein the first group includes one or more DCSs from the plurality of DCSs. In particular, the first group is configured to provide active access to a first access area (e.g., to transmission/receive points in the first access area) for one or more UEs in the plurality of UEs. For instance, a DCS is assignable to a UE, and provides active access to the UE to transmission/receive points within the first access area.

In still another embodiment, another method for accessing a network is described. The method includes validating a UE upon initial entry to a communications network. The communications network comprises a plurality of transmission/receive points, one of which supports wireless, radio access to the communications network for one or more UEs. The method also includes assigning a dedicated connection signature (DCS) to the UE. The DCS provides active access for the UE to an access area comprising one or more transmission/receive points providing wireless radio access to the communications network.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 3C is a table illustrating the increase of available DCSs as a serviceable geographic area of a transmit/receive point is reduced, in accordance with one embodiment of the present disclosure.

FIG. 8 is a flow diagram illustrating a method for providing system access to a wireless, radio communications network for a UE, in accordance with one embodiment of the present disclosure.

DETAILED DESCRIPTION OF ILLUSTRATIVE EMBODIMENTS

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present disclosure illustrate the implementation of a UE centric system access solution that is configurable to support wireless virtual networks. Other embodiments of the present disclosure also provide for contention-free quick access at any time across the wireless, radio network in a manner that is independent of the transmission/receiving point.

Figure 1:
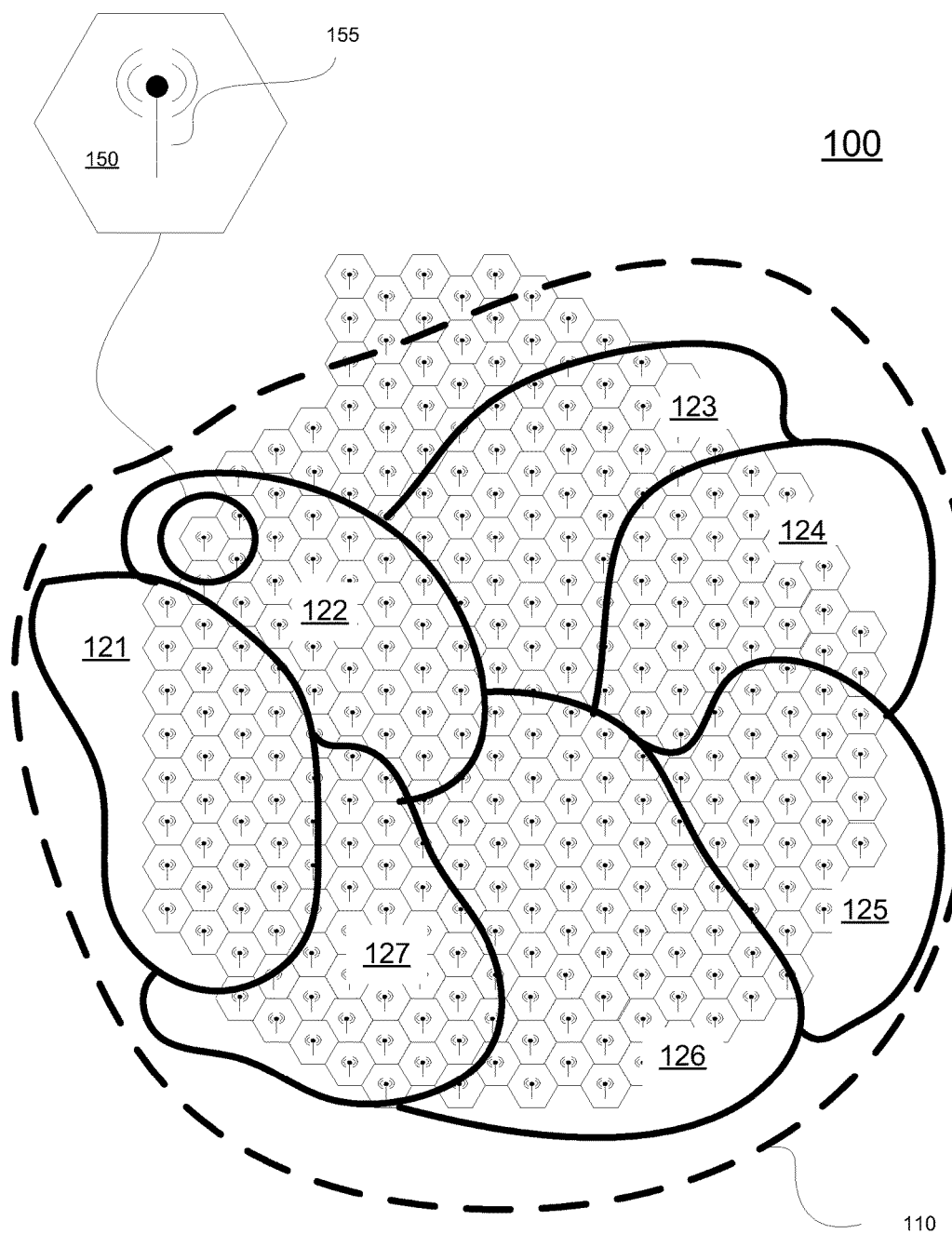
FIG. 1 is a diagram of a wireless, radio network that is configured to implement a UE centric system access solution, in accordance with one embodiment of the present disclosure.

FIG. 1 is a diagram of a wireless, radio network 100 that is configured to implement a UE centric system access solution, in accordance with one embodiment of the present disclosure. In particular, the network 100 is configured to implement DCS associations with UEs in order to enable contention-free quick access and fast connection setup for access events. Previously those access events implemented a contention based initial entry setup process for access activities described below. On the other hand, embodiments of the present disclosure provide for contention-free, quick access and fast connection setup that avoids the initial entry setup process under various access activity scenarios, to include, but not limited to, a transition from idle to active/connection mode; link failure and retry; bandwidth request (e.g., for short packet transmissions); uplink resynchronization when UE is in idle mode; and UE location update in when the UE is in idle mode.

As shown in FIG. 1, the wireless, radio network 100 includes a region no, wherein the region includes a plurality of transmission/receive points. At least one transmission/receive point (e.g., transmission/receive point 150) supports access to the wireless, radio network 100 to one or more UEs. For instance, a representative transmission/receive point includes a base station that is configurable to provide access to the wireless, radio network 100 to one or more UEs that are within signal range of the base station (e.g., station 155). Representative transmission/receive point 150 is drawn as a six-sided polygon, by convention, however other shapes for transmission/receive points are supported in other embodiments. The UEs include mobile and static devices configured to transmit and receive information (e.g., voice, data, etc.) with other devices using the communication network 100.

For example, the transmission/receive point in the wireless, radio network 100 may support one or more types of systems, such as those providing voice services, data services, messaging, or any other type of services. For instance, wireless systems that provide circuit-switched voice service include second-generation wireless telephony technology (2G) systems such as Code Division Multiple Access (CDMA) and GSM, and third-generation telephony technology 3G such as CDMA2000 and UMTS. Also, systems that can provide the data service include 2G, 3G, fourth generation telephony technology (4G), also known as long term evolution (LTE), evolution data optimized (EVDO), Wi-Fi, etc. Still other types of wireless systems are contemplated, including UE centric virtualized radio access networks (RAN).

In some embodiments, radio network 100 is a virtual RAN that is configured to implement transmit point virtualization to increase radio access capacity. With transmit point virtualization, a network can dynamically select the best transmission/receiving point or points to serve a particular UE, wherein the transmit point selection is transparent to the UE. For instance, a transmitting/receiving point supports wireless access to the communication network. Embodiments of the present disclosure provide for active, contention free, and fast access to the communication network for the UE through the use of a dedicated connection signature. More particularly, embodiments provide for active, contention free, and fast access to access areas comprising one or more transmitting/receiving points in order to access the communication network.

Region 110 is configured into one or more access areas. For instance, as shown in FIG. 1, region no includes access areas 121-127. At least one of the access areas includes one or more transmission/receive points, wherein the transmission/receive points provide access to the wireless, radio network 100 to one or more UEs that are within signal range. For illustration, access area 121 includes a group of transmission/receive points. Other transmission/receive points may also include groups of transmission/receive points. In that manner, a UE traveling throughout region 110 is able to access the wireless, radio network 100 through any supporting transmission/receive point in region 110. For example, in a virtual RAN, a UE may be served by one or more transmission/receive points. Further, the number of transmission/receive points serving a UE may vary over time, and the configuration of these transmission/receive points are transparent to the UE. In embodiments of the present disclosure, the UE-centric DCS based access scheme provides for access to the communication network through one or more transmission/receive points in region 110, and more particularly to transmission/receive points in a corresponding access area (e.g., one of the access areas 121-127).

Wireless, radio network 100 is configured to include a plurality of DCSs that provide active access to one or more UEs throughout region 110. By employing a large number of well constructed random DCS access sequences (e.g., Zadoff-Chu code sequences, etc.), and intelligent code and access management strategies, DCS assignment is able to decouple UEs from transmission/receive points, and enables fast connection setup across a virtual radio access network. In particular, one UE is served by multiple transmission/receive points that do not have individual cell identifier.

In particular, network 100 is configured to assign a first DCS to a first UE. The first DCS, as implemented by the first UE, provides active access to the first UE to one or more transmission/receive points within a first access area (e.g., access area 121). That is, the first UE is able to use the first DCS to communicate with any transmission/receive point in the first access area during an active connection. As such, the first DCS provides active access to the first UE to the wireless, radio network through the first access area.

Figure 2A:
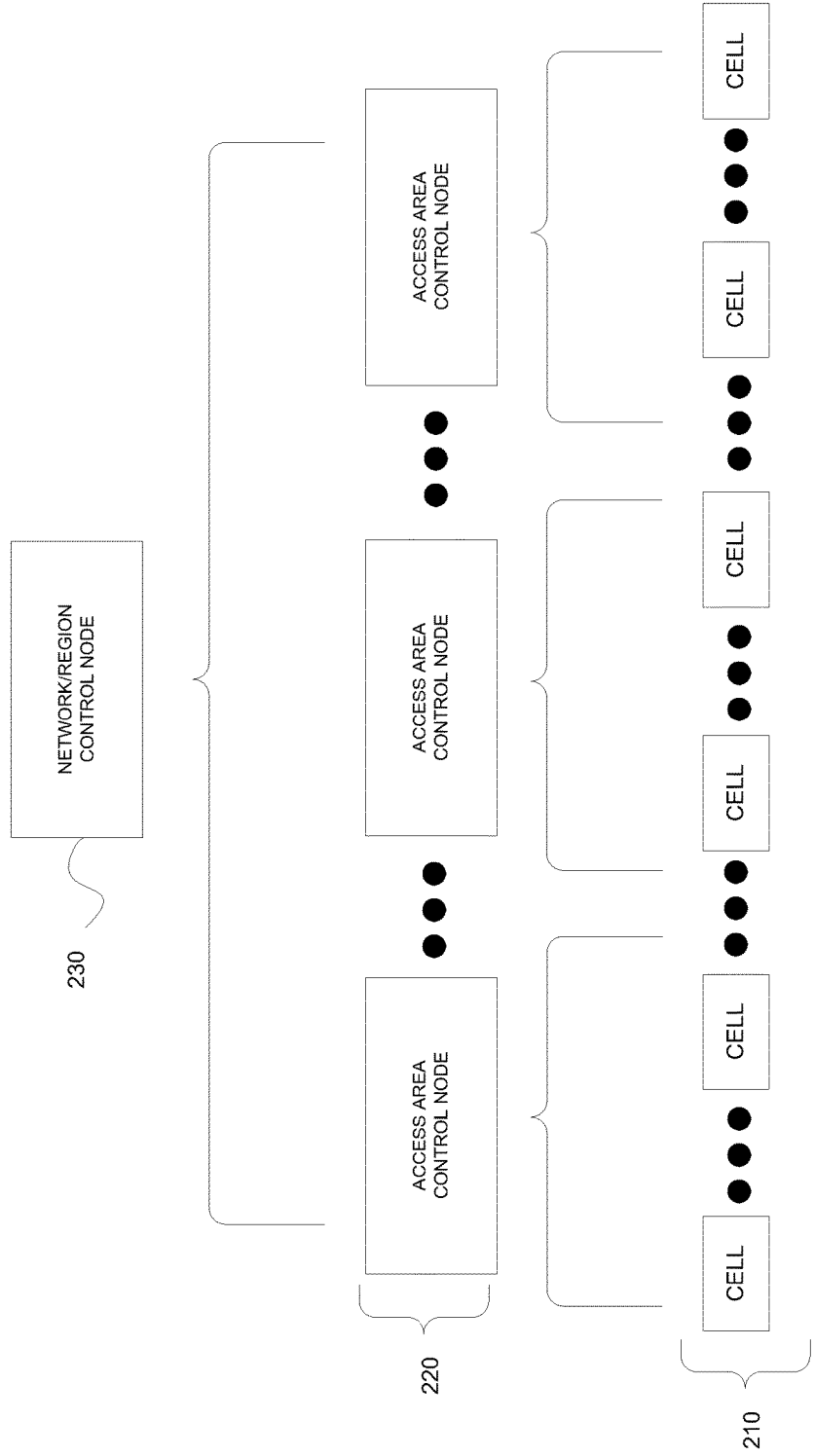
FIG. 2A is a diagram illustrating a control structure for implementing a UE centric system access solution to the wireless, radio network of FIG. 1, in accordance with one embodiment of the present disclosure.

FIG. 2A is a diagram illustrating a control structure and/or hierarchy 200A for implementing a UE centric system access solution to a communications network, in accordance with one embodiment of the present disclosure. For instance, control structure 200A is configurable to control the distribution and management of DCS sequences providing UE centric system access to the wireless, radio network of FIG. 1, in accordance with one embodiment of the present disclosure.

As shown in FIG. 2A, one or more transmission/receive points 210 provide wireless access to a radio network, such as, the communications network 100 of FIG. 1. For example, a transmission/receive point comprises a base station that is configurable to provide initial and active access to the wireless, radio network for one or more UEs. The transmission/receive points support signature sequence detection for both initial access and unified/active access. In addition, each transmission/receive point maintains the active sequence sets for UEs it is serving, and potentially will serve. In addition, a transmission/receive point is configured to support signal strength measurements on an uplink channel and report the measurements to higher level control.

In one embodiment, the transmission/receive points are grouped into one or more access areas. The access areas are associated with one or more access area control nodes 220. For instance, at least one access area is associated with a corresponding access area control node. The access area control node facilitates and/or provides for distribution and management of the DCSs used by UEs that are serviced by transmission/receive points in the access area. That is, an access area control node 220 is configured to manage all transmission/receive points in the access area to ensure cooperation between transmission/receive points. In particular, the access area control nodes 220 implement the contention free management of DCSs within its corresponding access area. In addition, two or more access area control nodes 220 cooperatively provide contention free management of DCS between bordering access areas. Further, the access area control node provides for the assignment of serving transmission/receive points and its optimization for each UE based on uplink measurements associated with the UE. An access area control node 220 also maintains access profiles for UEs serviced by transmission/receive points within the access area and notifies each transmission/receive point with profiles of UEs serviced within the access area, to include unified DCS sequences. Also, an access area control node 220 is able to monitor the mobility and positioning of UEs within the access area. That information is relayed to higher level nodes. Furthermore, the access area control node 220 is configured to assign DCS sequences to UEs during the initial access process, to assign active DCS sequences to UEs as directed by a network/region control node, and to manage soft-switching of DCS sequences between two access areas.

A network/region control node 230 provides for contention free management of DCSs used within a region. In particular, the network/region control node 230 manages the underlying access area control nodes 220. For instance, the network/region control node 230 manages the distribution of DCS sequences to UEs using transmission/receive points throughout the region, as implemented through a middle control layer of corresponding access area control nodes, and a lower control layer of individual transmission/receive points. For instance, the network/region control node 230 is configurable to assign DCS and UE pairs for use within a corresponding region. In addition, the network/region control node 230 is configurable to shift at least one DCS between two access areas in the region to accommodate increased demand for DCSs within an access area. That is, the network/region control node 230 is configured to dynamically coordinate the DCS sequence allocations between two or more access areas based on a DCS sequence allocation and reuse strategy. In addition, the network/region control node 230 is configured to monitor the mobility of UEs in coordination with the access area control nodes 220, and to share the access profiles of various UEs between various virtual access areas.

Figure 2B:
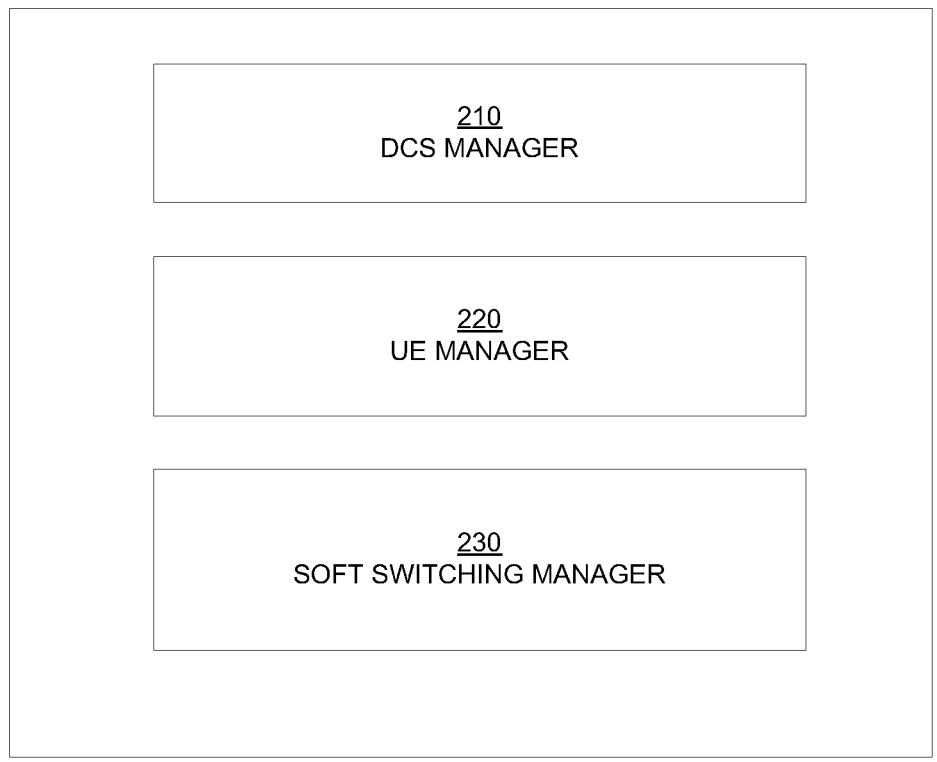
FIG. 2B is a diagram of a control node of the control structure of FIG. 2A, in accordance with one embodiment of the present disclosure.

FIG. 2B is a diagram of a control node 200B of the control structure of FIG. 2A, in accordance with one embodiment of the present disclosure. The control node is representative of the access area control node 220 of FIG. 2A, in one embodiment. The control node is representative of the network/region control node 230 of FIG. 2A, in one embodiment.

In particular, control node 200B includes a DCS manager 210 that is configured to distribute and manage the implementation of DCS/UE pairs within a region. For instance, at the network/region control node level, the control node 200B is configured to distribute groups of DCSs to access areas in a reuse pattern to maximize the use of a plurality of DCSs. In addition, the control node 200B is configured to assign a DCS to a corresponding UE, in a DCS/UE pair, for use in an access area. Implementation of the assignment is accomplished at the access area control node level.

Control node 200B includes UE manager 220 that is configured to track UEs serviced by transmission/receive points within a corresponding access area and/or region. For instance, UE manager 220 is able to obtain and store location information and other identifying information (e.g., DCS assignment, device identifier, etc.) for a corresponding UE. In one embodiment, the location information is obtained through triangulation of signal strength (e.g., uplink channel strength) received by one or more transmission/receive points within a signal range of the corresponding UE. In one embodiment, the control and management of information related to UEs is performed at the network/region control node in order to implement contention free management of DCS/UE pairs throughout a region. In another embodiment, the control and management of information related to UEs is performed at the access area control node, in one case, in order to implement the contention free management of DCS/UE pairs at a regional level as managed by the overlying network/region control node, and in another case to implement the contention free management of DCS UE pairs at the access area level as managed by a corresponding access area control node.

The control node 200B also includes a soft switching manager 230 that is configured to coordinate the switching of DCS assignments as a UE moves from one access area to another. A soft switching manager 230 is located both at the access area control node and at the network/region control node. As such, soft switching managers 230 at the both levels are able to communicate and cooperatively provide for switching of DCS sequences for a particular UE for seamless access to transmit/receive points within a region between two access areas.

Figure 3A:
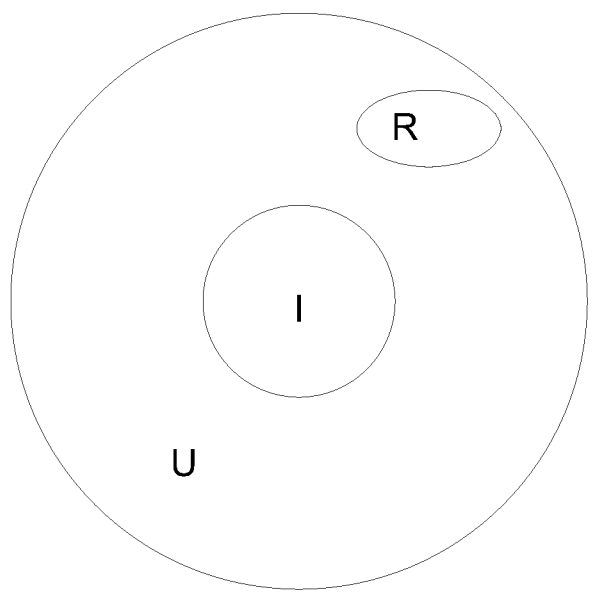
FIG. 3A is a diagram of the distribution of dedicated connection signatures (DCSs) throughout a region that includes a plurality of transmit/receive points providing access to a wireless, radio network, in accordance with one embodiment of the present disclosure.

FIG. 3A is a diagram 300A of the distribution of a plurality of dedicated connection signatures (DCSs) throughout a region that includes a plurality of transmission/receive points providing access to a wireless, radio network, in accordance with one embodiment of the present disclosure. The plurality of DCS sequences is divided into three non-overlapping sets: set {I} for performing initial accesses; set {U} for performing active connection accesses; and set {R} as reserved sequences. In one embodiment, each UE/device is assigned a unique DCS sequence from the set {U}, after competing authorization through the initial access process.

As previously described, a DCS once assigned in a DCS/UE pair provides for UE centric active access to a wireless, radio communications network. In particular, the DCS provides for an connection to transmission/receive points within an access area that is always connected or active, even when the UE is in an idle mode. That is, the DCS is always valid and is always associated with the UE, until further reassignment. This further reduces signaling overhead, as an air link is not needed to perform initial access connections when performing access events, previously described (e.g., uplink resynchronization, transitions from idle to active modes, etc.).

Figure 3B:
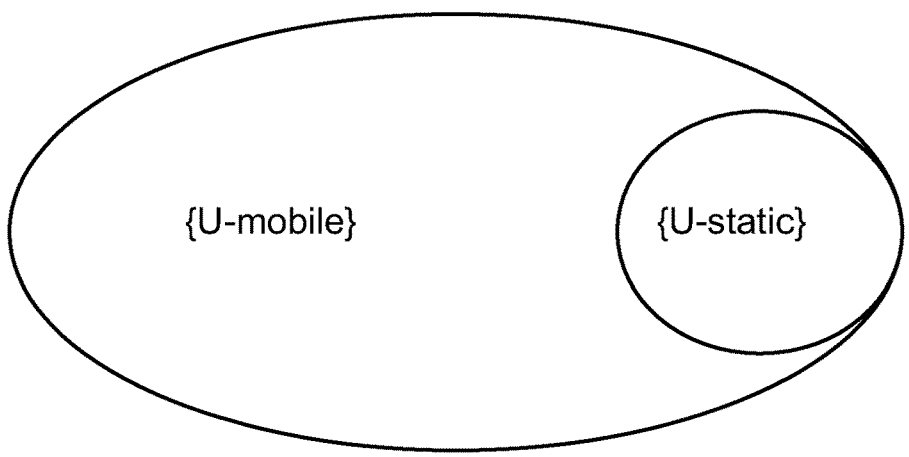
FIG. 3B is a diagram of a distribution of DCSs providing active access to a wireless, radio network for mobile and static UEs, in accordance with one embodiment of the present disclosure.

FIG. 3B is a diagram of a distribution of DCSs providing active access to a wireless, radio network into mobile and static UEs, in accordance with one embodiment of the present disclosure. As shown in FIG. 3B, the set {U-mobile} includes DCS sequences that are assigned to mobile UEs. Also, the set {U-static} includes DCS sequences that are assigned to static UEs (e.g., smart meters, etc.).

Turning now to FIG. 3C, a table 300C is shown illustrating the increase of available DCSs as a serviceable geographic area of a transmission/receive point is reduced, as a deployment trend in present and future wireless cellular networks, in accordance with one embodiment of the present disclosure. Specifically, table 300C illustrates the use of a large number of DCS sequences throughout a region, especially as the size of a service area of a transmission/receive point is reduced, wherein the region includes one or more access areas that are made up of one or more transmission/receive points.

In particular, given a sequence length of 839 bits, two sizes of service areas of transmission/receive points (in radius) are given. The first service area size is approximately 13 kilometers (km) like those used in current cellular network deployments, whereas the second service area size is approximately 5 km emulating present and future cellular network deployments. That is, the first service area size supports up to 13 km between the UE and the base station of a supporting transmission/receive point, and the second service area size is smaller in that it is configured to support up to 5 km between the UE and the corresponding base station.

For example, as shown in Table 300C when implementing a Zadoff-Chu sequence pattern for determining the set of random DCS access sequences, both sizes of service areas of transmission/receive points give zero cross-correlation between two DCS sequences with the same root at a receiver, and very good cross-correlation (e.g., 0.0345) of any two DCS sequences having different roots. Both of these scenarios give contention free DCS access to the wireless, radio network. However, by decreasing the service area size of a transmission/receive point, the number of available sequences will increase. For instance, in a service area size of 13 km, a cyclical shift within a sequence of 13 is implemented to give approximately 53,000 DCS sequences. By reducing the service area size to 5 km, a cyclical shift of 5 can be implemented, which gives approximately 140,000 DCS sequences for use within a region. This increase of the set of DCS sequences also is the case where the sequence length is 421 or 211.

In embodiments, the division of the plurality of DCSs into those for static UEs/devices and those for mobile UEs/ devices is performed to facilitate differing strategies for implementing intelligent code and access management. For instance, in one embodiment, for the set {U-static} for static UEs, a code reuse strategy is implemented throughout a region of access areas which maximizes the code reuse efficiency. The code reuse strategy is not access specific for static UEs. In that manner, this minimizes the set {U-static} of DCS sequences used for static devices. This, in turn, makes available more DCS sequences for use in the set {U-mobile} for mobile UEs.

Figure 4:
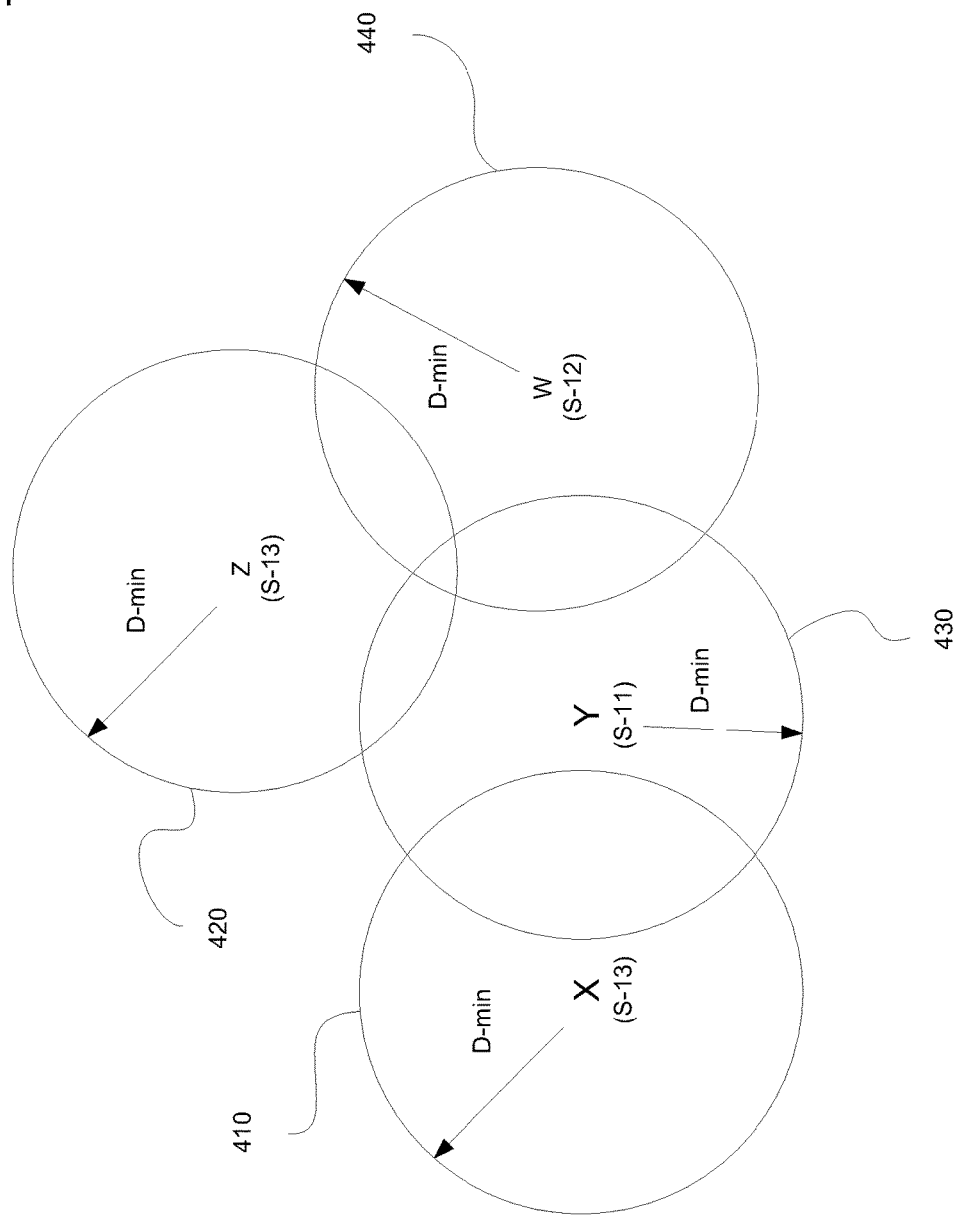
FIG. 4 is a diagram illustrating a distribution of DCSs throughout a region comprising a plurality of transmit/receive points providing access to a wireless, radio communications network, wherein the distribution relies on the separation of a DCS sequence used by one static UE from other static UEs using the same DCS sequence, in accordance with one embodiment of the present disclosure.

In one embodiment, FIG. 4 is a diagram illustrating a distribution 400 of DCSs for static UEs throughout a region, wherein the region comprises a plurality of transmission/ receive points providing access to a wireless, radio communications network. The distribution 400 maximizes the code reuse efficiency in order to minimize the number of DCS sequences in the set {U-static}. In particular, the distribution 400 relies on a separation of DCS sequences used by static UEs by a minimum distance (D-min). That is, two UEs can be assigned the same DCS sequence as long as each is separated from the other by a D-min distance.

In the example provided above, the two UEs are identifiable through their respective locations. That is, a UE is identified through a unique identifier that comprises a DCS and a geographic location of the UE. For instance, location of a UE is determined through triangulation of two or more signals, including measuring the strength of an uplink channel strength signal to determine distance from the measuring transmit/receive point. That is, through triangulation, a geographic location of a UE is determined based on uplink channel strength measurements from at least two base stations of two corresponding transmit/receive points.

In FIG. 4, UEs W, X, Y, and Z are located in a region that comprises a plurality of transmission/receive points providing wireless, radio access to a communications network. DCS sequences are assigned based on the D-min strategy outlined above. For instance, UE W is assigned a DCS sequence S-12 to make a UE/DCS pair that is uniquely identifiable through its DCS sequence and UE location. Other pairs include X/S-13, Y/S-11, and Z/S-13. All of the pairs co-exist because there is no overlapping between geographic areas (e.g., as defined by D-min) between UEs. In that manner, the UEs X and Z are assigned the same DCS (S-13) because they are separated by a distance greater than at least D-min.

On the other hand, for the set {U-mobile} for mobile UEs, a differing strategy is implemented that maximizes the geographic footprint of the access area used throughout a region. In addition, the number of available DCS sequences is maximized, and the number of the reuse factor is minimized. These are employed in an effort to reduce the instances of when soft-switching of DCSs sequences is required near the border of two access areas.

Figure 5:
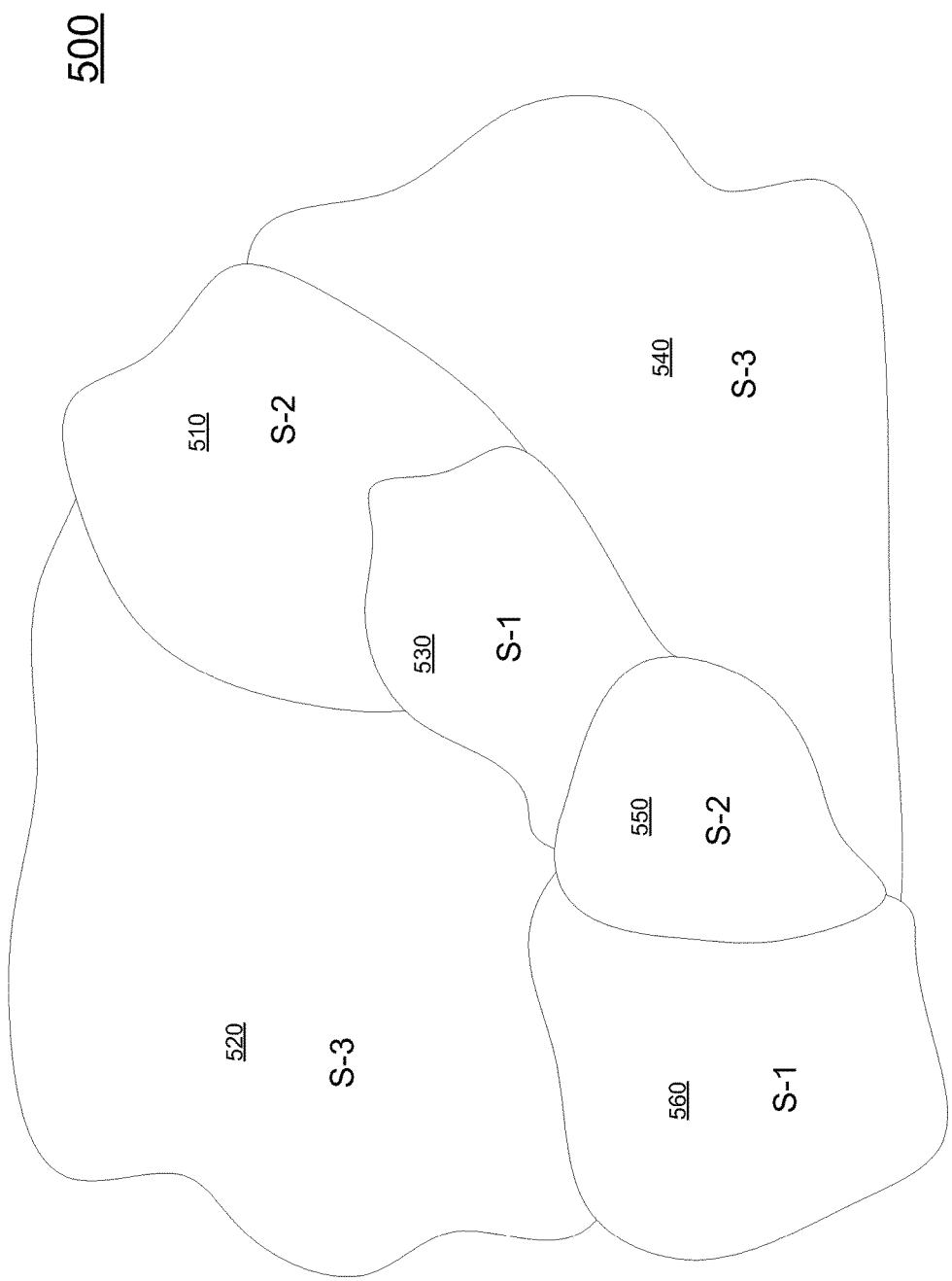
FIG. 5 is a diagram illustrating the reuse of DCSs in a distribution of DCSs throughout a region, wherein the region includes multiple access areas, in accordance with one embodiment of the present disclosure.

For example, FIG. 5 is a diagram illustrating a reuse pattern of DCS sequences throughout a region that is implemented in an efficient UE centric unified system access solution that is based on reducing DCS switching for a UE between two access areas, in accordance with one embodiment of the present disclosure. At its core, the code reuse strategy as implemented in reuse pattern 500 for mobile UEs maximizes the size of access areas in a region, wherein the region 500 includes multiple access areas. In addition, the pool of DCS sequences is made as large as possible (e.g., supporting reduced service area size of a transmit/receive point, increasing the access sequence length, etc.), and the reuse factor is reduced to as small as possible through an optimized access division. This strategy provides for reliable soft-switching of DCS sequences through the use of mobility grace areas, as will be further described in relation to FIG. 6. In addition, this strategy is further augmented through dynamic sequence adjustment between two or more access areas.

As an illustration, FIG. 5 shows a region 500 including six access areas 510, 520, 530, 540, 550, and 560. The region 500 is associated with a plurality of DCS sequences that is divided by a reuse factor. For instance, the reuse factor shown in FIG. 5 is three, which gives one possible distribution pattern 500. As such, the plurality of DCS sequences is divided into three groups: S-1, S-2, and S-3. The pattern is configured to provide contention free access for DCS/UE pairs that are operational between two adjacent access areas, or between transmit/receive points of two adjacent access areas. As an illustration, the group S-1 is assigned to access areas 530 and 560. Because transmit/receive points, or more particularly service areas from these transmit/receive points, from both of these access areas 530 and 560 do not overlap in coverage in a common geographical area, two UEs using DCS sequences associated with the group S-1 but serviced by different transmit/receive points (e.g., one in access area 530 and one in access area 560) have contention free access to the wireless, radio communications network. Further, the group S-2 is assigned to access areas 510 and 550 with no overlapping area. Also, the group S-3 is assigned to access areas 520 and 540, with no overlapping area. Additionally, the size of an access area is determined by the number of DCS sequences available to a region, a reuse factor, and the UE density throughout the region.

Figure 6:
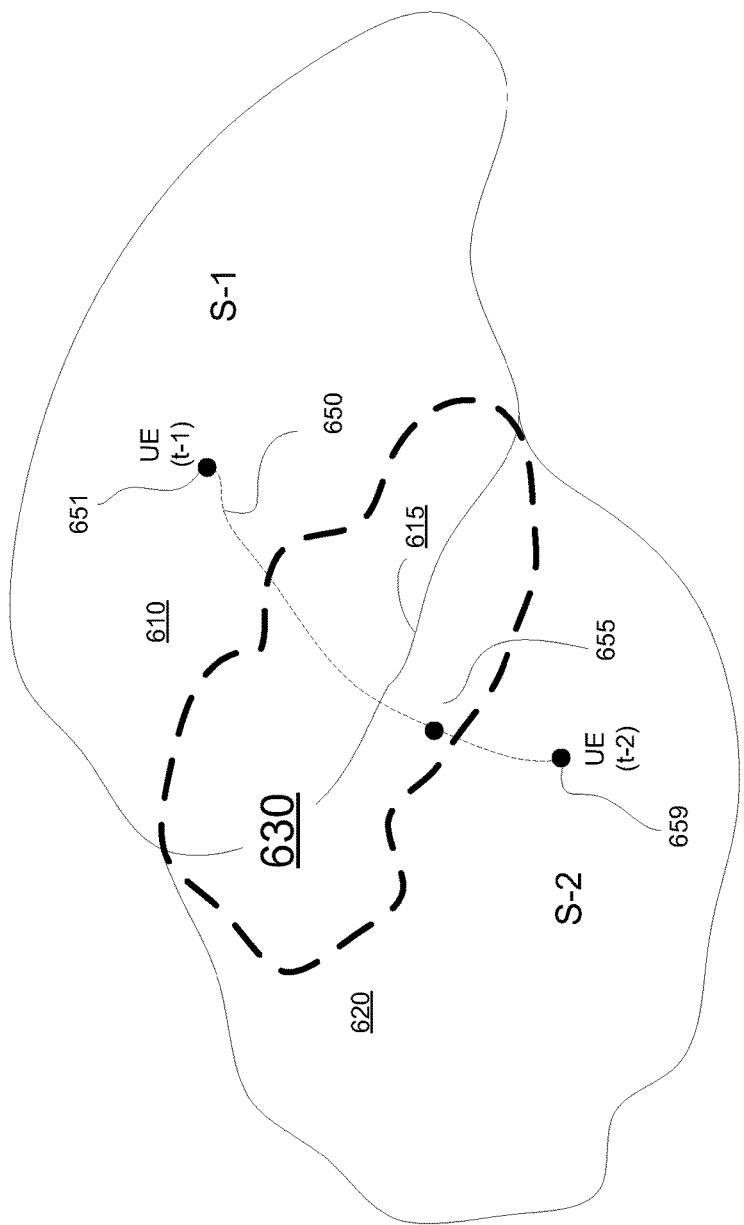
FIG. 6 is a diagram illustrating a mobility grace area used for facilitating soft switching of DCSs as a UE moves from one access area to another access area, in accordance with one embodiment of the present disclosure.

FIG. 6 is a diagram 600 illustrating a mobility grace area 630 used for facilitating soft switching of DCSs as a UE moves from one access area to another access area, in accordance with one embodiment of the present disclosure. The distribution and configuration of access areas shown in diagram 600 maximizes the geographic footprint of each access area used throughout a region in order to reduce the instances of soft-switching of DCS sequences near the border of two access areas.

In particular, diagram 600 includes two access areas 610 and 620, wherein the size of the access areas are maximized depending on the various factors listed above to minimize the instances of soft-switching. Access area bio is assigned to a first group of DCS sequences, S-1. Access area 620 is assigned to a second group of DCS sequences, S-2, wherein the DCS sequences in the groups S-1 and S-2 do not overlap in order to provide for contention free access to the communications network for DCS/UE pairs. In addition, access area bio is adjacent to access area 620 and share a border 615.

A mobility grace area 630 is included to provide for reliable soft-switching of DCS sequences as a UE moves between the two access areas 610 and 620. In particular, the mobility grace area 630 is located at the border 615 between the two access areas 610 and 620 and provides for universal access to DCS sequences from both of the access areas 610 and 620. That is, transmission/receive points within the mobility grace area 630 are able to accommodate active accesses to the underlying wireless, radio communications network for any DCS/UE pair that is associated with one of the access areas 610 and 620. In that manner, the mobility grace area 630 acts as a neutral zone in which DCS/UE pairs can operate without switching DCS sequences. This greatly reduces the effect of "ping-pong" hysteresis involved when switching from one DCS associated with one access area to another DCS associated with another access area each time a UE crosses the border.

In addition, the mobility grace area 630 promotes reliable soft-switching as a switch is made when it is determined that the corresponding UE is well within the boundary of the new access area and has moved away from the old access area. In that case, once the determination is made, a switch to a new DCS associated with the new access area is assigned to the corresponding UE, and communications with the wireless, radio network continues for the UE using the new DCS. For instance, FIG. 6 illustrates the movement along path 650 of a UE device from a first position at point 651 associated with time t-1 to a second position at point 659 that is associated with time t-2. As the UE device moves within the mobility grace area 630 it maintains its old DCS sequence first assigned through the access area control node associated with access area 610, even after crossing the access area boundary 615 and accessing the network using transmission/receive points from access area 620. When it is determined that the UE has fully moved away from the access area 610 (e.g., at a point 655 along path 650), the UE is assigned a new DCS from the group of DCS sequences given to access area 620.

The management of DCS sequences between different access areas allows for dynamic sequence adjustment between two or more access areas, in one embodiment. For instance, one or more control nodes (e.g., an access area control node and/or network/region control node) is able to determine when a large number of UEs are moving into or are present in a given access area. In order to accommodate for the increased number of UEs, DCS sequences from an access area that is underutilized may be dynamically transferred for use within the access area that is over-utilized for a temporary period of time. As an example, a first group of DCS sequences is assigned to a first access area, and a second group of DCS sequences is assigned to a second access area. Dynamic code share allows for a DCS sequence originally assigned to the first group serving the first access area to be newly assigned to the second group for use within the second access area.

Figure 7:
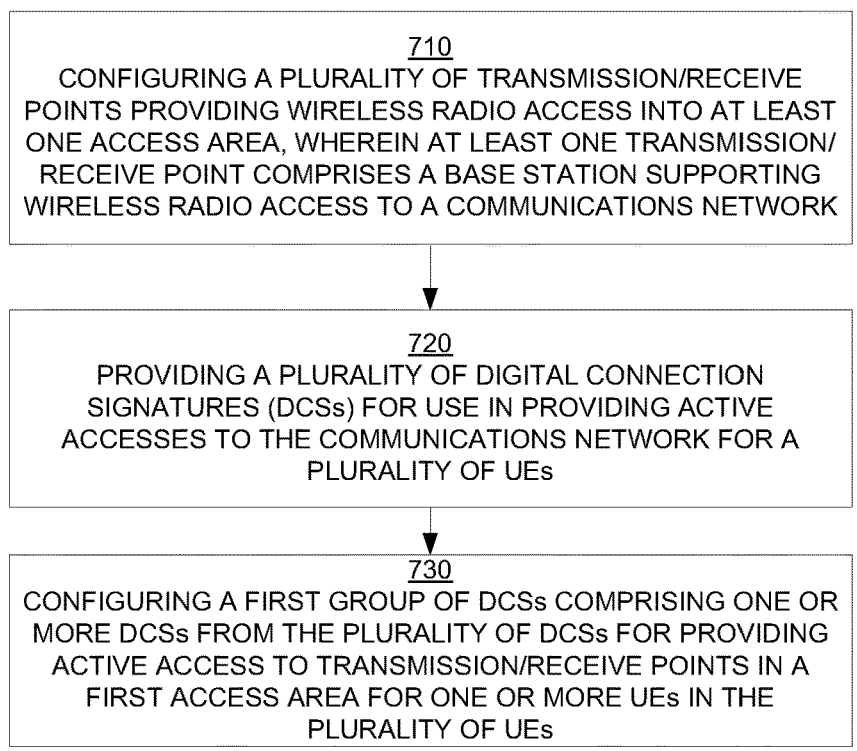
FIG. 7 is a flow diagram illustrating a method for providing system access to a wireless, radio communications network for a plurality of UEs, in accordance with one embodiment of the present disclosure.

FIG. 7 is a flow diagram 700 illustrating a method for configuring a network, and more specifically for providing system access to a wireless, radio communications network for a plurality of UEs, in accordance with one embodiment of the present disclosure. In one embodiment, the method outlined in diagram 700 is implementable within network 100 shown in FIG. 1 for providing system access using a DCS sequence.

At 710, the method includes configuring a plurality of transmission/receive points providing wireless radio access into at least one access area. The plurality of transmission/receive points is provided in a region, wherein the region includes one or more access areas, and wherein at least one access area includes one or more transmission/receive points. At the fundamental level, at least one transmission/receive point comprises a base station supporting wireless radio access to a communications network.

At 720, the method includes providing a plurality of DCS sequences for use in providing active access to the communications network for a plurality of UEs. The DCS sequences are assigned in a DCS/UE pair, after the UE is authorized to the network through an initial access process. After authorization, the UE is assigned a DCS to actively access the communications network in any of a series of access events, including, in part, an uplink re-synchronization, transition from idle to active mode (e.g., used for connecting a UE back to a wireless network through a supporting transmission/receive point in an access area when the UE is coming out of an idle mode), virtual handover (e.g., between different radio access technologies), link failure and retry, UE location updating (e.g., during idle mode), and used for sending communication between transmission/receive points in an access area and a UE (e.g., bandwidth request for short packet transmissions).

At 730, the method includes configuring a first group of DCS sequences, including one or more DCS sequences from the plurality of DCSs. DCS sequences in the first group provide for active access to transmission/receive points in a first access area. In particular, the DCS sequences are associated with one or more UEs from the plurality of UEs. That is, a DCS/UE pair provides for a UE centric model, wherein the corresponding DCS allows active access to the UE to transmission/receive points within the first access area.

In another embodiment, the DCS sequences are configured into one or more groups of DCS sequences. The groups are formed according to a reuse factor, wherein one group of DCS sequences is assignable to one or more access areas. More particularly, the groups of DCS sequences are assigned to access areas in a pattern in such a way to promote contention free access to the wireless, radio communications network between transmission/receive points of two adjacent access areas. For instance, the reuse pattern 500 of DCS sequences previously described in relation to FIG. 5 is formed according to a reuse factor of three in an effort to reduce the instances of soft-switching of DCS sequences between two access areas.

FIG. 8 is a flow diagram 800 illustrating a method for providing system access to a wireless, radio communications network for a UE, in accordance with one embodiment of the present disclosure. In another embodiment, flow diagram 800 is implemented within a computer system including a processor and memory coupled to the processor and having stored therein instructions that, if executed by the computer system causes the system to execute a method for program execution that is capable of providing system access to a wireless, radio communications network for a UE. In still another embodiment, instructions for performing a method are stored on a non-transitory computer-readable storage medium having computer-executable instructions for causing a computer system to perform a method for program execution that is capable of providing system access to a wireless, radio communications network for a UE. The method outlined in flow diagram 800 is implementable by one or more components of the systems and devices 200B and computer system 1000 of FIGS. 2B and 10, respectively.

At 810, the method includes validating a UE upon initial entry to a communications network through a corresponding transmission/receive point. The communications network includes a plurality of transmission/receive points, one of which includes a base station supporting wireless radio access to the communications network for one or more UEs in its serviceable area.

At 820, the method includes assigning a DCS to the UE, as a DCS/UE pair. More particularly, the DCS provides active access for the UE to transmission/receive points providing wireless radio access to the communications network. At least one transmission/receive point includes a base station provides wireless radio access.

In one embodiment, the DCS provides active access for the UE to transmission/receive points grouped into an access area. For instance, the method includes configuring a plurality of DCS sequences into one or more groups based on a reuse factor. A group of DCS sequences is assignable to one or more access areas, wherein one or more transmission/receive points in at least one access area provides for wireless radio access to the communications network. The groups are assigned to access areas in a pattern that promotes contention free access to DCS/UE pairs at least between transmission/receive points of two adjacent access areas.

Figure 9A:
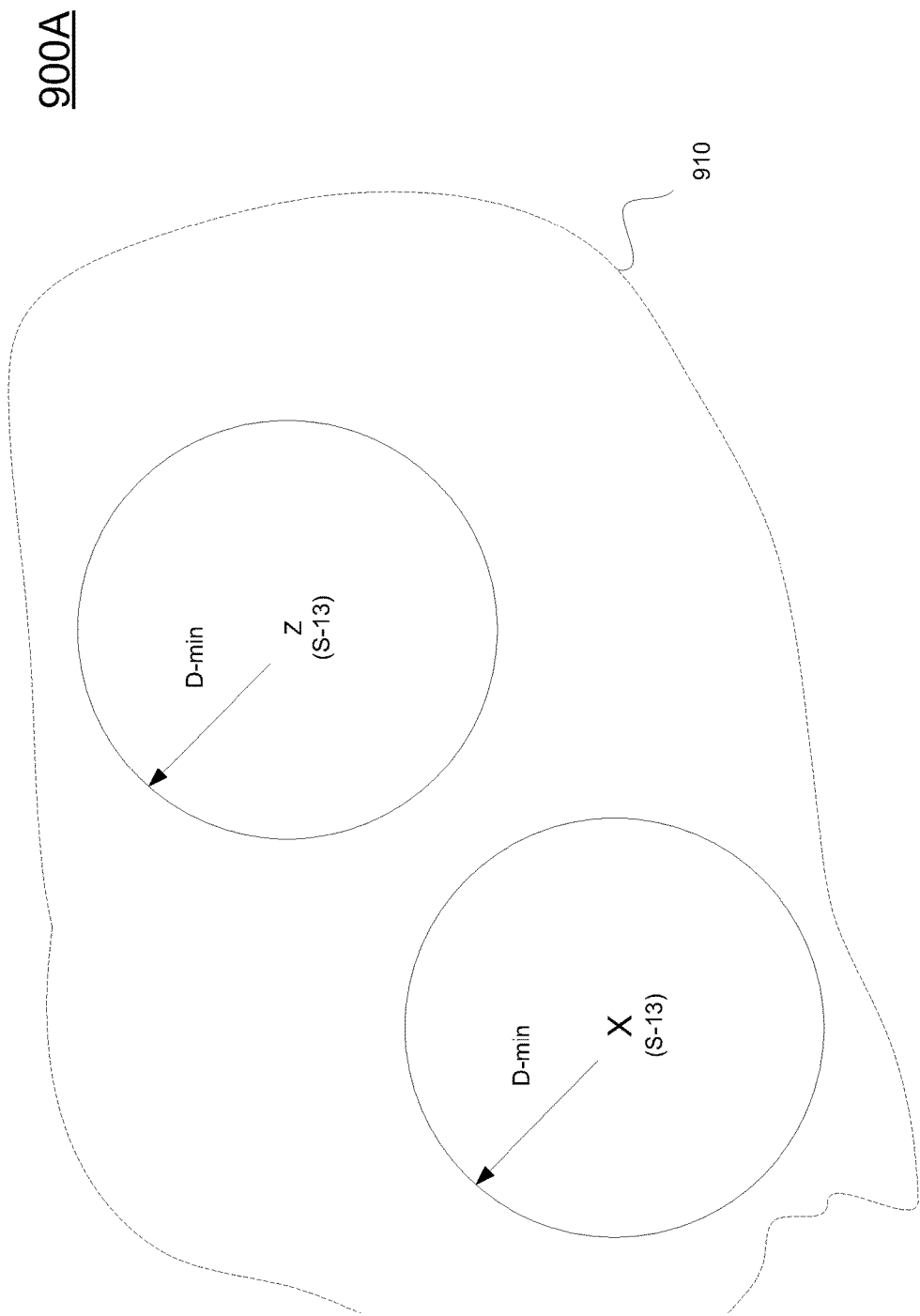
FIG. 9A is a diagram illustrating a distribution of DCSs throughout a region comprising a plurality of nodes providing access to a wireless, radio communications network, wherein the distribution relies on the separation of a DCS sequence used by one UE from other UEs using the same DCS sequence, in accordance with one embodiment of the present disclosure.

FIG. 9A is a diagram illustrating a dynamic distance aware solution for assigning DCS/UE pairs within a region of transmission/receive points 910, wherein the transmission/receive points provide wireless access to a communications network, in accordance with one embodiment of the present disclosure. The UE centric unified system access solution provides for a DCS allocation and DCS code reuse strategy for mobile UEs that assigns DCS sequences to UEs depending on a distance separation (D-min). The maximized reuse distance (e.g., D-min) is based on available numbers of DCS sequences, and the UE density. In particular, a UE ("Z") is assigned a DCS sequence of S-13 after checking to determine that no other UE is assigned the same DCS sequence within a minimum distance (D-min). Correspondingly, another UE labeled "X" is also assigned a DCS sequence of S-13 because the separation between locations of the two UEs ("X" and "Z") is more than at least D-min.

In one embodiment, a central node is configured to monitor location and DCS/UE pair assignments. That is, a UE identifier includes the DCS sequence and location information for a corresponding UE. That is, only one level operating system control is needed at a network/region control node level. As such, access areas are not utilized within the dynamic distance aware solution.

Additionally, mobile UEs can be further categorized based on different mobility levels. The different mobility levels are associated with different reuse distance thresholds (D-min). For instance, mobile UEs can be categorized into a slow or fast categories. Those UEs categorized as being slow may be associated with a D-min that is less than a D-min for UEs categorized as being fast. Additional categories for differentiating UEs are contemplated and supported in other embodiments.

Figure 9B:
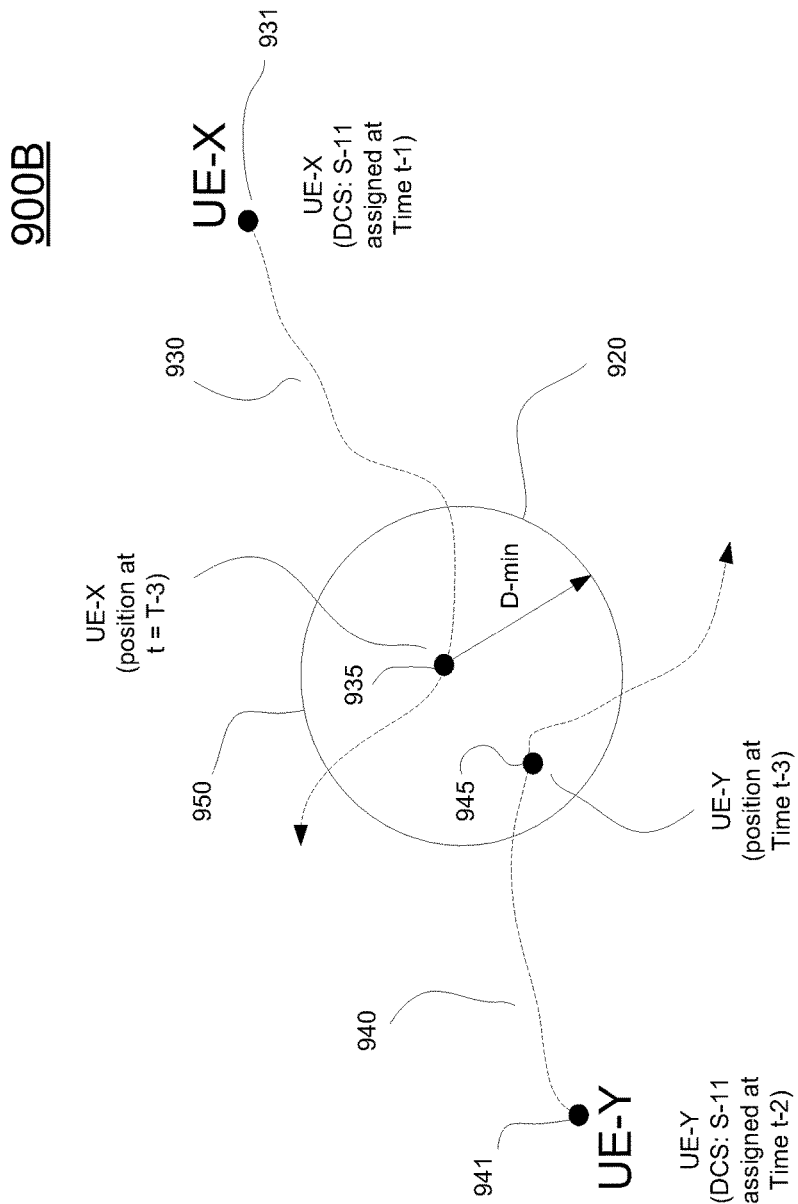
FIG. 9B is a diagram illustrating the movement of two UE devices assigned with the same DCS and the various solutions implemented for contention free access to the wireless, radio network, in accordance with one embodiment of the present disclosure.

FIG. 9B is a diagram 900B illustrating the movement of two UE devices assigned with the same DCS and the various solutions implemented for contention free access to the wireless, radio network, in accordance with one embodiment of the present disclosure. FIG. 9B illustrates the implementation of the dynamic distance aware solution first shown in FIG. 9A, and as such, only one control node is required for DCS/UE pair management, in one embodiment.

For instance, diagram 900B shows the movement of UE-X along path 930 and the movement of UE-Y along path 940. At point 931, at time t-1, a control node (not shown) assigns a DCS sequence (DCS S-11) to UE-X for use in accessing the wireless communications network. Furthermore, at point 941, at time t-2, the control node also assigns DCS S-11 to UE-Y for use in accessing the wireless communications network. The two UEs are separated by a distance (e.g., separated by at least a D-min) such that there is contention free access to the communications network.

However, at time t-3, UE-X is located at point 935 along path 930 and UE-Y is located at point 945 along path 940. Moreover, the two UEs are located within a D-min distance of each other. That is, UE-Y is located in an area 950 defined by the location of UE-X at point 935 and D-min. The control node is able to monitor the movement of either or both of the UEs in order to provide contention free access to the wireless communications network.

In one embodiment, the control node is able to reassign the DCS used by UE-Y at or before point 945 along path 940. That is, the control node provides for soft-switching of DCS sequences when it is determined that any two UEs are within a certain range (e.g., the range may be greater than, less than, or equal to D-min), and moving closer to each other. As such, since UE-Y is now assigned to a new DCS, the DCS sequence S-11 used by UE-X at point 935 is able to provide contention free access to the communications network because no other UE using the same DCS is within the D-min area 950.

In another embodiment, a zero switching solution is provided. In particular, as the control node determines that any two UEs are within a certain range (e.g., the range may be greater than, less than, or equal to D-min), and moving closer to each other, a multiplexing of the DCS sequence is implemented to provide contention free access to the wireless, radio communications network. For instance, frequency or time multiplexing (using different sub-frames) may be implemented to provide contention free access to the communications network.

Figure 10:
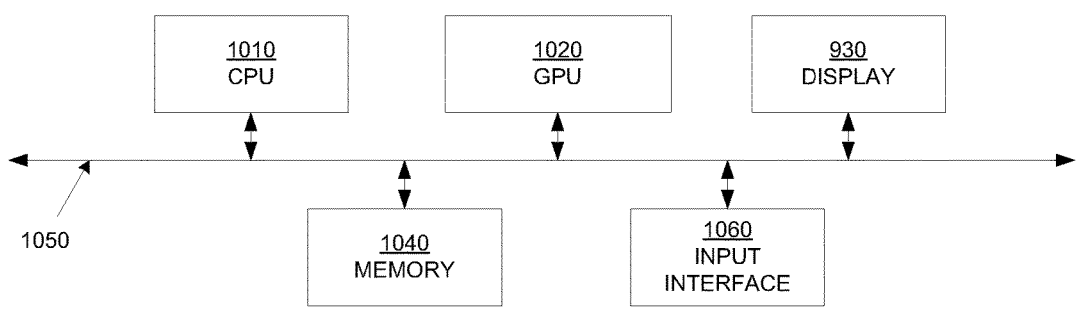
FIG. 10 depicts a block diagram of an exemplary device suitable for implementing the present methods, in accordance with one embodiment of the present disclosure.

FIG. 10 is a block diagram of an example of a computing system 1000 capable of implementing embodiments of the present disclosure. Computing system 1000 broadly represents any single or multi-processor computing device or system capable of executing computer-readable instructions. Examples of computing systems 1000 include, without limitation, workstations, laptops, client-side terminals, servers, distributed computing systems, handheld devices, or any other computing system or device. In its most basic configuration, computing system 1000 may include at least one processor 1010 and a system memory 1040.

Both the central processing unit (CPU) 1010 and the graphics processing unit (GPU) 1020 are coupled to memory 1040. System memory 1040 generally represents any type or form of volatile or non-volatile storage device or medium capable of storing data and/or other computer-readable instructions. Examples of system memory 1040 include, without limitation, RAM, ROM, flash memory, or any other suitable memory device. In the example of FIG. 10, memory 1040 is a shared memory, whereby the memory stores instructions and data for both the CPU 1010 and the GPU 1020. Alternatively, there may be separate memories dedicated to the CPU 1010 and the GPU 1020, respectively. The memory can include a frame buffer for storing pixel data drives a display screen 1030.

The computing system 1000 includes a user interface 1060 that, in one implementation, includes an on-screen cursor control device. The user interface may include a keyboard, a mouse, and/or a touch screen device (a touchpad).

CPU 1010 and/or GPU 1020 generally represent any type or form of processing unit capable of processing data or interpreting and executing instructions. In certain embodiments, processors 1010 and/or 1020 may receive instructions from a software application or hardware module. These instructions may cause processors 1010 and/or 1020 to perform the functions of one or more of the example embodiments described and/or illustrated herein. For example, processors 1010 and/or 1020 may perform and/or be a means for performing, either alone or in combination with other elements, one or more of the monitoring, determining, gating, and detecting, or the like described herein. Processors 1010 and/or 1020 may also perform and/or be a means for performing any other steps, methods, or processes described and/or illustrated herein.

In some embodiments, the computer-readable medium containing a computer program may be loaded into computing system moo. All or a portion of the computer program stored on the computer-readable medium may then be stored in system memory 1040 and/or various portions of storage devices. When executed by processors 1010 and/or 1020, a computer program loaded into wireless communications device 1000 may cause processor 1010 and/or 1020 to perform and/or be a means for performing the functions of the example embodiments described and/or illustrated herein. Additionally or alternatively, the example embodiments described and/or illustrated herein may be implemented in firmware and/or hardware.

Embodiments of the present disclosure may be implemented by using hardware only or by using software and a necessary universal hardware platform. Based on such understandings, the technical solution of the present invention may be embodied in the form of a software product. The software product includes a number of instructions that enable a computer device (personal computer, server, or network device) to execute the method provided in the embodiments of the present disclosure.

Embodiments described herein may be discussed in the general context of computer-executable instructions residing on some form of computer-readable storage medium, such as program modules, executed by one or more computers or other devices. By way of example, and not limitation, the software product may be stored in a nonvolatile or non-transitory computer-readable storage media that may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), USB flash disk, digital versatile disks (DVDs) or other optical storage, magnetic cassettes, magnetic tape, removable hard disk, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Thus, according to embodiments of the present disclosure, apparatus and methods are described which illustrate the implementation of a UE centric solution for accessing a virtual radio access network. Embodiments of the present invention provide for DCS/UE pair assignments that allow for UE oriented fast connection setup in an always connection fashion throughout a region including one or more transmission/receive points used for wireless access to a communications network. In other embodiments, the UE centric solution provides for reduced signaling overhead, as no control signaling is required when moving from one transmission/receive point to another, as both transmit/receive points recognize the DCS/UE pair as giving active access to the wireless, radio communications network.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present invention and its advantages have been described in detail, it should be understood that various changes substitutions, and alterations can be made herein without departing from the spirit and scope of the invention as defined by the appended claims. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

What is claimed is:

1. A method for operating a network, comprising:
configuring a plurality of transmission/receive points providing radio access into at least one access area, wherein at least one transmission/receive point supports radio access to a communications network;
providing a plurality of dedicated connection signatures (DCSs) for use in providing active access to the communications network for a plurality of UEs; and
configuring a first group of DCSs comprising one or more DCSs from the plurality of DCSs for providing active access to a first access area for one or more UEs in the plurality of UEs, wherein the one or more UEs comprise one UE served by multiple transmission/receive points according to one DCS of the one or more DCSs in the first group of DCSs.

2. The method of claim 1, further comprising:
configuring the plurality of DCSs into one or more groups of DCSs based on a reuse factor, such that a group of DCSs is assignable to one or more access areas; and
assigning the one or more groups of DCSs to access areas in a pattern to promote contention free access at least between two adjacent access areas.

3. The method of claim 1, further comprising:
configuring a second group of DCSs comprising one or more DCSs from the plurality of DCSs for providing active access a second access area for one or more UEs in the plurality of UEs; and
configuring a mobility grace area located at a border between the first and second access areas, and wherein DCSs from the first and second groups provide active access to the communications network from both the first and second access areas in the mobility grace area.

4. The method of claim 3, further comprising:
providing soft switching of DCSs for a UE when moving between the first and second access areas through the mobility grace area.

5. The method of claim 1, further comprising:
configuring a second group of DCSs comprising one or more DCSs from the plurality of DCSs for providing active access to a second access area for one or more UEs in the plurality of UEs; and
shifting at least one DCS between the first and second access areas.

6. The method of claim 1, further comprising:
determining a geographic location of a UE; and
configuring a unique identifier associated with the UE comprising an assigned DCS and the geographic location of the UE.

7. The method of claim 1, further comprising:
connecting a UE back to the communications network through the first access area using an associated DCS from the first group of DCSs when the UE is coming out of idle mode.

8. The method of claim 1, further comprising:
sending communication between transmission/receive points in the first access area and a UE using an associated DCS.

9. A method for accessing a network, comprising:
validating a user equipment (UE) upon initial entry to a communications network, wherein the communications network comprises a plurality of transmission/receive points, at least one of which supports wireless radio access to the communications network for one or more UEs; and
assigning a dedicated connection signature (DCS) to the UE, wherein the DCS provides active access for the UE to the communications network, wherein the UE is served by multiple transmission/receive points of the plurality of transmission/receive points according to the DCS.

10. The method of claim 9, further comprising:
configuring a plurality of DCSs into one or more groups of DCSs based on a reuse factor, such that a group of DCSs is assignable to a plurality of access areas providing wireless radio access to the communications network, wherein at least one access area comprises one or more transmission/receive points; and
assigning the one or more groups of DCSs to access areas in a pattern to promote contention free access at least between transmit/ receive points of two adjacent access areas.

11. A network component for operating a network, comprising:
a non-transitory memory storage comprising instructions; and
one or more processors in communication with the memory, wherein the one or more processors execute the instructions for:
configuring a plurality of transmission/receive points providing radio access into at least one access area, wherein at least one transmission/receive point supports radio access to a communications network;
providing a plurality of dedicated connection signatures (DCSs) for use in providing active access to the communications network for a plurality of UEs; and
configuring a first group of DCSs comprising one or more DCSs from the plurality of DCSs for providing active access to a first access area for one or more UEs in the plurality of UEs, wherein the one or more UEs comprise one UE served by multiple transmission/receive points according to one DCS of the one or more DCSs in the first group of DCSs.

12. The network component of claim 11, wherein the instructions further comprise instructions for:
  configuring the plurality of DCSs into one or more groups of DCSs based on a reuse factor, such that a group of DCSs is assignable to one or more access areas; and
  assigning the one or more groups of DCSs to access areas in a pattern to promote contention free access at least between two adjacent access areas.

13. The network component of claim 11, wherein the instructions further comprise instructions for:
  configuring a second group of DCSs comprising one or more DCSs from the plurality of DCSs for providing active access a second access area for one or more UEs in the plurality of UEs; and
  configuring a mobility grace area located at a border between the first and second access areas, and wherein DCSs from the first and second groups provide active access to the communications network from both the first and second access areas in the mobility grace area.

14. The network component of claim 13, wherein the instructions further comprise instructions for:
  providing soft switching of DCSs for a UE when moving between the first and second access areas through the mobility grace area.

15. The network component of claim 11, wherein the instructions further comprise instructions for:
  configuring a second group of DCSs comprising one or more DCSs from the plurality of DCSs for providing active access to a second access area for one or more UEs in the plurality of UEs; and
  shifting at least one DCS between the first and second access areas.

16. The network component of claim 11, wherein the instructions further comprise instructions for:
  determining a geographic location of a UE; and
  configuring a unique identifier associated with the UE comprising an assigned DCS and the geographic location of the UE.

17. The network component of claim 11, wherein the instructions further comprise instructions for:
  connecting a UE back to the communications network through the first access area using an associated DCS from the first group of DCSs when the UE is coming out of idle mode.

18. The network component of claim 11, wherein the instructions further comprise instructions for:
  sending communication between transmission/receive points in the first access area and a UE using an associated DCS.

19. A network component for operating a network, comprising:
  a non-transitory memory storage comprising instructions; and
  one or more processors in communication with the memory, wherein the one or more processors execute the instructions for:
  validating a user equipment (UE) upon initial entry to a communications network, wherein the communications network comprises a plurality of transmission/receive points, at least one of which supports wireless radio access to the communications network for one or more UEs; and
  assigning a dedicated connection signature (DCS) to the UE, wherein the DCS provides active access for the UE to the communications network, wherein the UE is served by multiple transmission/receive points of the plurality of transmission/receive points according to the DCS.

20. The network component of claim 19, wherein the instructions further comprise instructions for:
  configuring a plurality of DCSs into one or more groups of DCSs based on a reuse factor, such that a group of DCSs is assignable to a plurality of access areas providing wireless radio access to the communications network, wherein at least one access area comprises one or more transmission/receive points; and
  assigning the one or more groups of DCSs to access areas in a pattern to promote contention free access at least between transmit/receive points of two adjacent access areas.

* * * * *